(12) United States Patent
Ali et al.

(10) Patent No.: US 7,882,340 B2
(45) Date of Patent: Feb. 1, 2011

(54) FINGERPRINT READER REMOTELY RESETTING SYSTEM AND METHOD

(75) Inventors: Valiuddin Y. Ali, Cypress, TX (US); Jeffrey C. Parker, Magnolia, TX (US); Lan Wang, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 808 days.

(21) Appl. No.: 11/888,365

(22) Filed: Jul. 31, 2007

(65) Prior Publication Data
US 2009/0037715 A1   Feb. 5, 2009

(51) Int. Cl.
*G06F 15/177* (2006.01)
*G06K 9/00* (2006.01)

(52) U.S. Cl. .............. 713/1; 382/115; 382/124
(58) Field of Classification Search ........ 713/1
See application file for complete search history.

(56) References Cited

U.S. PATENT DOCUMENTS

| | | | |
|---|---|---|---|
| 5,764,789 A * | 6/1998 | Pare et al. | 382/115 |
| 5,796,857 A * | 8/1998 | Hara | 382/124 |
| 6,823,464 B2 | 11/2004 | Cromer et al. | |
| 6,877,097 B2 * | 4/2005 | Hamid et al. | 713/186 |
| 6,914,517 B2 * | 7/2005 | Kinsella | 340/5.83 |
| 7,111,321 B1 | 9/2006 | Watts, Jr. et al. | |
| 7,210,167 B2 | 4/2007 | Brezak et al. | |
| 7,257,714 B1 * | 8/2007 | Shen | 713/186 |
| 7,620,212 B1 * | 11/2009 | Allen et al. | 382/115 |
| 7,702,984 B1 * | 4/2010 | Lee et al. | 714/742 |
| 2002/0147914 A1 | 10/2002 | Arnold | |
| 2003/0128240 A1 * | 7/2003 | Martinez et al. | 345/764 |
| 2004/0078603 A1 | 4/2004 | Ogura et al. | |
| 2004/0104807 A1 * | 6/2004 | Ko | 340/5.83 |
| 2004/0153656 A1 | 8/2004 | Cluts et al. | |
| 2005/0138399 A1 | 6/2005 | Cheston et al. | |
| 2006/0136717 A1 | 6/2006 | Buer et al. | |
| 2006/0176146 A1 | 8/2006 | Krishan et al. | |
| 2007/0005951 A1 | 1/2007 | Davis et al. | |
| 2007/0058841 A1 | 3/2007 | Miura et al. | |
| 2007/0131774 A1 * | 6/2007 | Celestini | 235/462.45 |

OTHER PUBLICATIONS

PCT International Search Report and Written Opinion in co-pending PCT International Application No. PCT/US2008/008363, International Filing Date of Jul. 7, 2008 and entitled "Fingerprint Reader Resetting System and Method" having a date of mailing of Feb. 12, 2009.

* cited by examiner

*Primary Examiner*—Suresh K Suryawanshi

(57) ABSTRACT

A fingerprint reader resetting method comprising enabling an electronic device to accept a reset command for a fingerprint reader in response to a physical presence state being set to unlocked during initialization of an electronic device to reset a state of the fingerprint reader.

17 Claims, 3 Drawing Sheets

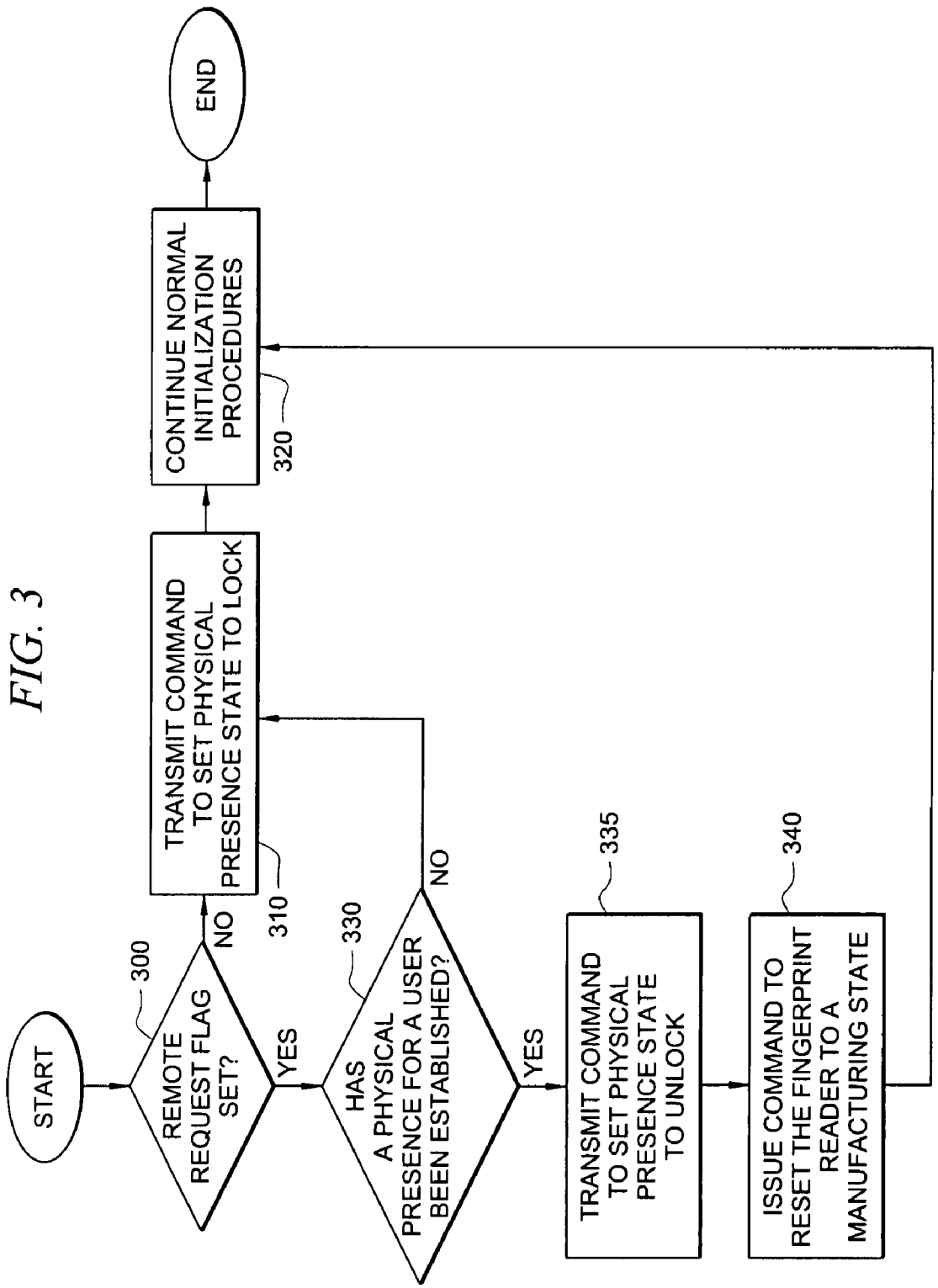

FINGERPRINT READER REMOTELY RESETTING SYSTEM AND METHOD

BACKGROUND

Some fingerprint readers require an owner's fingerprint and/or some other form of secure authorization (e.g., a password) by the owner to perform certain functions and/or activities within the fingerprint reader and/or an electronic device to which the fingerprint reader is coupled. One such activity is the resetting of the fingerprint reader to enable a new and/or other user to access and/or use the respective fingerprint reader and/or electronic device. However, in some circumstances, the secure authorization for the owner is corrupted and/or otherwise unavailable for use.

BRIEF DESCRIPTION OF THE DRAWINGS

FIG. 3 is a flowchart of another embodiment of a fingerprint reader resetting method.

DETAILED DESCRIPTION OF THE DRAWINGS

Figure 1:
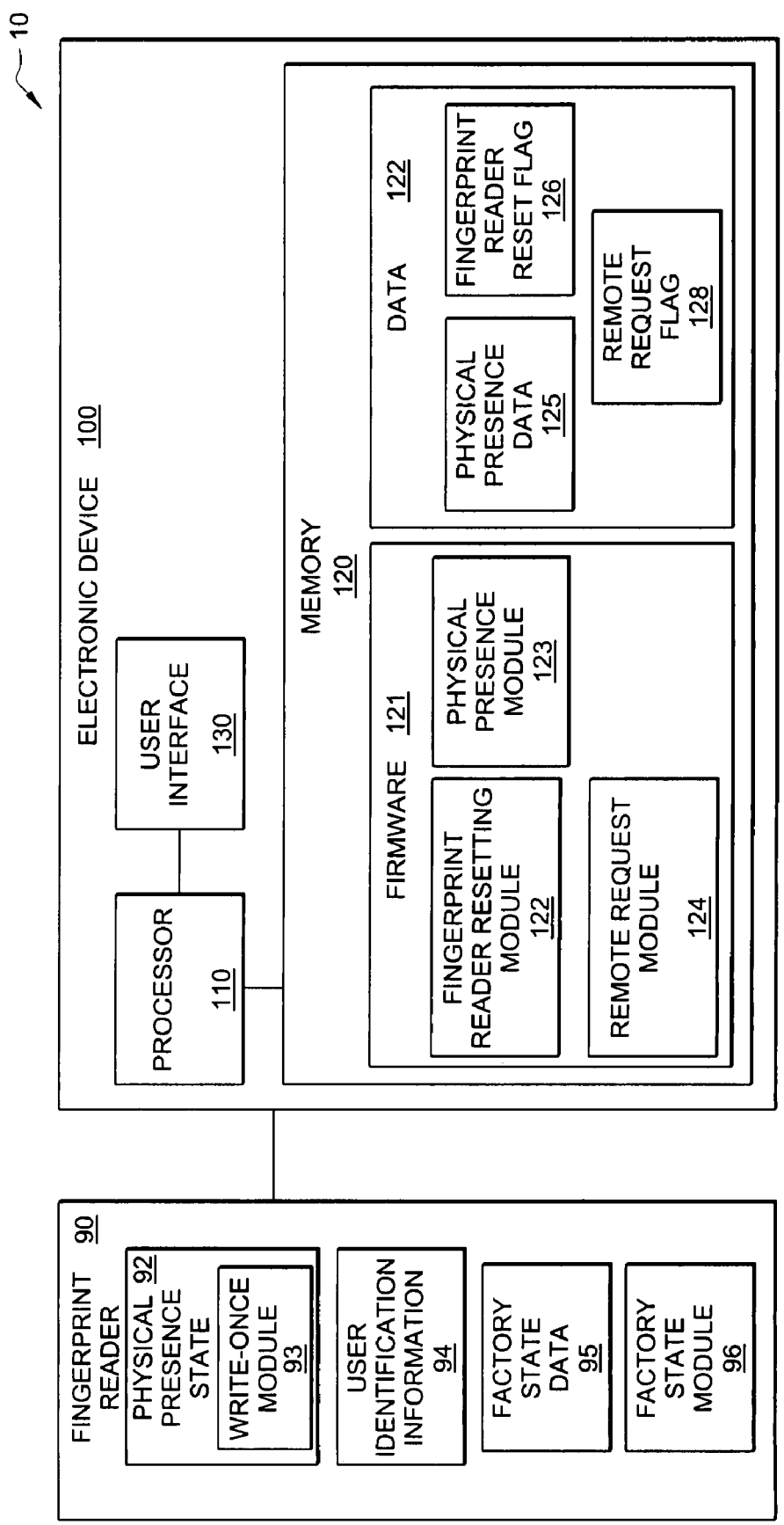
FIG. 1 illustrates a block diagram of an electronic device in which an embodiment of a fingerprint reader resetting system is employed to advantage.

FIG. 1 is a block diagram of an electronic device 100 comprising an embodiment of a fingerprint reader resetting system 10. Fingerprint resetting system 10 is configured to securely reset a fingerprint reader to a factory state without having knowledge of an owner's and/or user's authorization information (e.g., fingerprint, password, etc.). In the illustrated embodiment, fingerprint reader resetting system 10 comprises a fingerprint reader 90 coupled to electronic device 100. It should be understood that fingerprint reader 90 may be externally (e.g., via a Universal Serial Bus (USB) interface, etc.) or internally coupled to electronic device 100. Fingerprint reader 90 is a biometric sensor/device that scans and/or matches a set of fingerprints to authenticate and/or verify the identity of a user, thereby enabling the user to securely access electronic device 100 and/or data in the electronic device 100. In the illustrated embodiment, fingerprint reader 90 comprises a physical presence state 92, user identification information 94, factory state data 95, and a factory state module 96. It should be understood that the components in fingerprint reader 90 may be a hardware only embodiment, a software only embodiment, or a combination hardware and software embodiment. It should also be understood that, in some embodiments, fingerprint reader 90 may comprise more or fewer components.

In some embodiments, physical presence state 92 is an indicator (e.g., a binary value, etc.) identifying whether fingerprint reader 90 is locked or unlocked, thereby respectively prohibiting or enabling fingerprint reader 90 to be reset. In some embodiments, when electronic device 100 is initialized, physical presence state 92 is clear (e.g., no value exists in physical presence state 92). Alternatively, physical presence state 92 can be set to locked and/or unlocked during initialization processes. In FIG. 1, physical presence state 92 comprises a write-once module 93 configured to enable one value to be written into physical presence state 92 (e.g., write once and read many; write once and read none, etc.). Once a value is written into physical presence state 92, write-once module 93 prevents any other value to be written into physical presence state 92 and/or be modified (e.g., including deleted) until electronic device 100 is reinitialized. Write-once module 93 is configured to prevent another software device from overriding fingerprint reader resetting module 121. In some embodiments, user identification information 94 stores the fingerprint and/or other identification information associated with one or more users of fingerprint reader 90. In the illustrated embodiment, factory state data 95 are the configurations and/or information stored and/or provided within fingerprint reader 90 when fingerprint reader 90 is initially used and/or delivered from the factory. Factory state module 96 is a set of executable commands and/or instructions configured to enable fingerprint reader 90 to be set or reset to a factory state (e.g., clearing any information stored in user identification information 94, installing factory state data 95, deleting any stored templates, clearing stored registers, etc.) and/or in a state in which a new user can use fingerprint reader 90.

Electronic device 100 can be any type of electronic device such as but not limited to a laptop computer, a tablet computer, a personal digital assistant (PDA), a cellular phone, a gaming device, or any type of portable or non-portable electronic device. In the illustrated embodiment, electronic device 100 comprises a processor 110, a memory 120, and a user interface 130. It should be understood that the components of electronic device 100 can be a hardware only embodiment, a software only embodiment, or a combination hardware and software embodiment. Processor 110 is used to manage and/or control the processes associated with managing and/or resetting of fingerprint reader 90. In the illustrated embodiment, memory 120 comprises firmware 121 and data 122. In some embodiments, firmware 121 is a set of read-only instructions used to manage various processors (e.g., initialization of electronic device 100, communications with an operating system, etc.) in electronic device 100. In the illustrated embodiment, firmware 121 comprises fingerprint reader resetting module 122, a physical presence module 123, and a remote request module 124. It should be understood that, in some embodiments, some components in firmware 121 may be combined and/or divided into other modules in firmware 121.

In some embodiments, fingerprint reader resetting module 122 is configured to manage and/or control the resetting processes for fingerprint reader 90. In some embodiments, physical presence module 123 manages and/or controls the process for verifying a physical presence of a user in close proximity to electronic device 100. Physical presence module 123 accepts proof and/or a user input (e.g., a set of keystrokes, entering and/or presenting a user's finger, etc.) indicating that the user authorizes the resetting of fingerprint reader 90, thereby substantially preventing an unauthorized and/or unsecure resetting by an unauthorized user and/or software device (e.g., malware, etc.). Remote request module 124 can accept remote reset requests from any wired and/or wireless network connection (e.g., an internet, etc.) at any time when electronic device 100 is operating (e.g., anytime after electronic device 100 is turned "on" after completing initialization processes).

Data 122 comprises databases and/or other types of data (tables, worksheets, files, etc.) used to enable fingerprint reader 90 to be reset. In the illustrated embodiment, data 122 comprises physical presence data 125, a fingerprint reader reset flag 126, and a remote request flag 128. Physical presence data 125 is the information and/or data used to verify the physical presence of a user in close proximity to electronic device 100. Fingerprint reader reset flag 126 is an indicator (e.g., a binary value, a software code, etc.) identifying whether a request to reset fingerprint reader 90 has been requested by a user of electronic device 100. For example, fingerprint reader reset flag 126 may comprise a value of "1" indicating that a request to reset has been made and a value of "0" indicating that no request has been made. In some embodiments, fingerprint reader reset flag 126 may be set anytime electronic device 100 is operating and/or when electronic device 100 is initialized. Remote request flag 128 is an indicator (e.g., a binary value, software code, etc.) identifying that a user and/or administrator has remotely requested to reset fingerprint reader 90. Remote request flag 128 stores the request until electronic device 100 is next initialized. User interface 130 enables a user to input a command (e.g., via a graphical user interface, a keyboard, a mouse, etc.) verifying a physical presence of the user.

Thus, in operation, during initialization processes, processor 110 executes physical presence module 123 to verify that a user is in close proximity to electronic device 100. In some embodiment, physical presence module 123 prompts a user to input a single or series of keystrokes (e.g., pressing a function key, inputting a word, presenting a finger, etc.) and/or execute a single or series of steps (e.g., selecting a mouse button, etc.) to verify the physical presence of the user. After the user input is received, physical presence module 123 verifies the input against physical presence data 125 to validate and/or ensure that the input matches a stored value (e.g., a stored password or other security token). If the user input matches, then physical presence module 123 communicates and/or notifies fingerprint reader resetting module 122 that the physical presence of the user is verified. Physical presence module 123 also sets physical presence state 92 to an "unlocked" state. Processor 110 then executes fingerprint reader resetting module 122 which identifies whether a fingerprint reader reset flag 126 has been set (e.g., has a value of "1"). If fingerprint reader reset flag 126 is set, fingerprint reader resetting module 122 transmits a request (e.g., a force reset command) to factory state module 96 to set fingerprint reader 90 to a factory state, whereupon factory state module 96 clears and/or deletes all information stored in user identification information 94 and configures fingerprint reader 90 with factory state data 95. Once fingerprint reader 90 is in a factory state, write-once module 93 prevents any other hardware and/or software module from issuing a reset command to fingerprint reader 90 until fingerprint reader 90 and/or electronic device 100 is reinitialized. In some embodiments, firmware 121 continues initialization processes for electronic device 100.

If, however, the user input for physical presence does not match and/or no user input is entered for a pre-established period of time, then, in some embodiments, physical presence module 123 can notify fingerprint reader resetting module 122 that the physical presence of the user is not verified and sets physical presence state 92 to a "locked" state, thereby prohibiting a user and/or other device from resetting fingerprint reader 90. The pre-established period of time can be any period of time (e.g., 2 seconds, 1 minute, etc.) identified as a default setting or identified by a user and/or administrator of electronic device 100. Once physical presence state 92 is locked, write-once module 93 any other hardware and/or software module from issuing a reset command to fingerprint reader 90 until fingerprint reader 90 and/or electronic device 100 is reinitialized. After physical presence state module 123 locks fingerprint reader 90, firmware 122 continues initialization processes for electronic device 100.

Embodiments of fingerprint reader resetting system 10 also enable an administrator and/or user to remotely reset fingerprint reader 90. In this embodiment, upon initialization of the electronic device 100, fingerprint reader resetting module 122 identifies whether remote request flag 128 is set (e.g., remote request flag 128 comprising a binary value of "1"). If remote request flag 128 has not been set (e.g., having a binary value of "0"), then fingerprint reader resetting module 122 transmits a request to physical presence state module 123 to set physical presence state 92 to locked. If, however, remote request flag 128 is set (e.g., having a binary value of "1"), then fingerprint reader resetting module 122 transmits a request to physical presence module 123 to verify the physical presence of a user in a proximate location to electronic device 100. In some embodiments, fingerprint reader resetting module 122 can bypass physical presence module 123 and enable a remote user and/or administrator to reset fingerprint reader 90 without the verification of the user in close proximity to electronic device 100. After physical presence module 123 verifies the physical presence of the user, physical presence module 123 sets physical presence state 92 to an unlocked state, and fingerprint reader resetting module 122 then issues a command to reset fingerprint reader 90 to a factory state. Otherwise, fingerprint reader resetting module 122 issues a command to physical presence module 123 to set physical presence state 92 to locked. Fingerprint reader resetting module 122 then clears the value stored in remote request flag 128.

Embodiments of fingerprint reader resetting system 10 also enable a user to prevent fingerprint reader 90 from being reset. Thus, in some embodiments, fingerprint reader resetting module 122 will prompt the user to verify and/or authorize resetting of fingerprint reader 90 if fingerprint reader resetting module 121 identifies that remote request flag 128 is set and prior to issuing the command to reset fingerprint reader 90. If a user does not authorize resetting of fingerprint reader 90 and/or the user does not acknowledge the prompt within a predetermined period of time, then physical presence state 92 is set to locked. In some embodiments, fingerprint reader resetting module 122 may notify a remote user and/or administrator that fingerprint reader 90 failed to reset.

Figure 2:
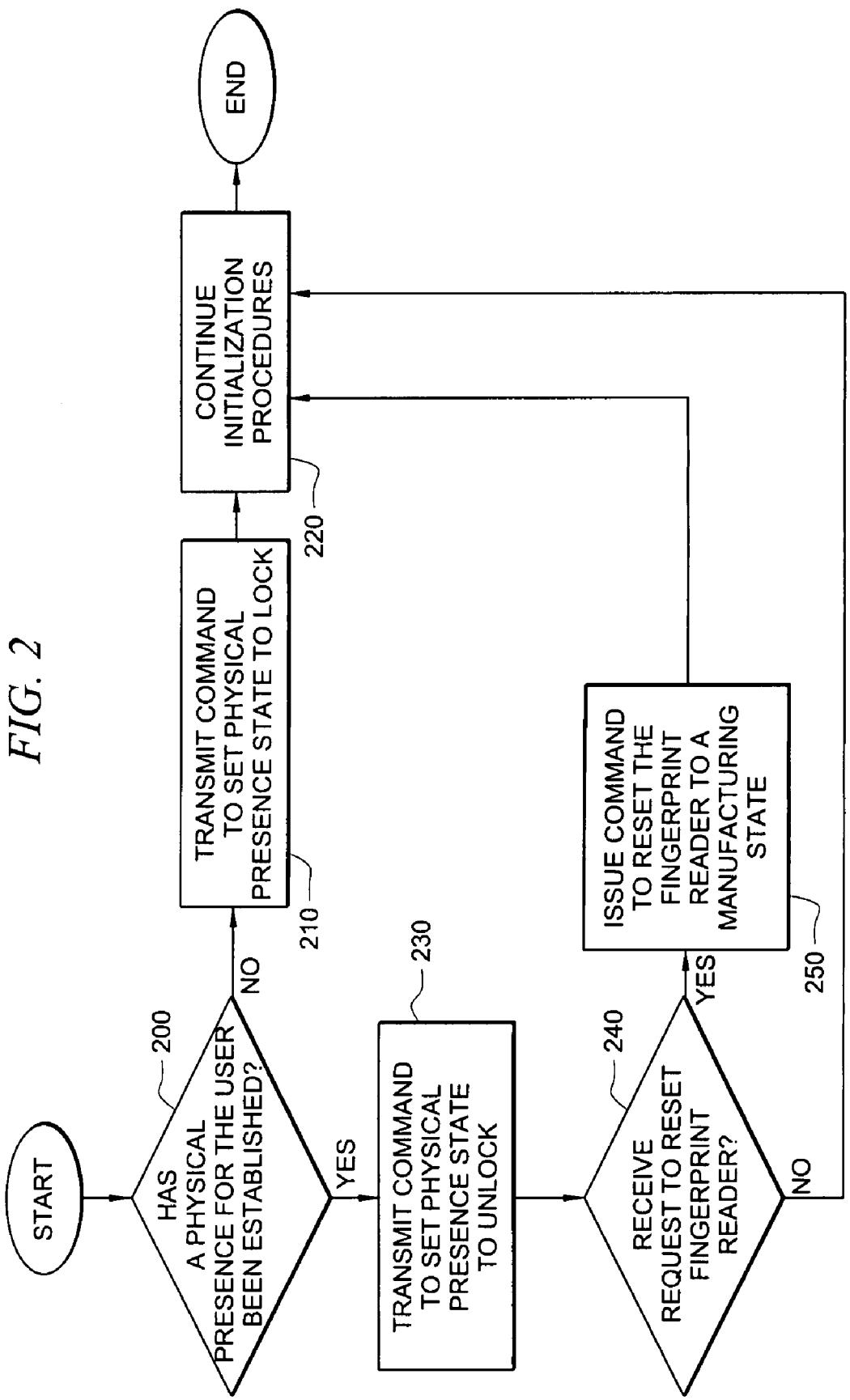
FIG. 2 is a flowchart of an embodiment of a fingerprint reader resetting method.

FIG. 2 is a flowchart of an embodiment of fingerprint reader resetting method. The method begins at decision block 200 with fingerprint reader resetting system 10 determining whether a physical presence for a user has been established for electronic device 100. If a physical presence has not been established ("no" output to the decision block 200) then fingerprint reader resetting system 10 transmits a command to set physical presence state 92 to locked (block 210). Fingerprint reader resetting system 10 then continues initialization procedures for electronic device 100 (block 220), with the method terminating thereafter.

Returning to decision block 200, if a physical presence for a user has been established ("yes" output decision block 200), fingerprint reader resetting system 10 sets physical presence state 92 to unlocked (block 230). Fingerprint reader resetting system 10 then determines whether a request to reset fingerprint reader 90 has been received and/or fingerprint reader reset flag 126 is set (decision block 240). If a request has been received ("yes" output to decision block 240), fingerprint reader resetting module 122 then issues a command to reset the fingerprint reader 90 to a factory state, with the method proceeding thereafter to block 220. Returning to decision block 240, if a request to reset fingerprint reader 90 has not been received ("no" output to decision block 240), the method thereafter proceeds to block 220.

FIG. 3 is a flowchart of another embodiment of a fingerprint reader resetting method. The method begins at decision block 300 with fingerprint reader resetting system 10 identifying whether remote request flag 128 has been set. If remote request flag 128 has not been set ("no" output to decision block 300), then fingerprint reader resetting system 10 transmits a command to fingerprint reader 90 to set physical presence state 92 to lock (block 310). Fingerprint reader resetting system 10 then continues initialization procedures for electronic device 100 (block 320), with the method terminating thereafter.

Returning to decision block 300, if remote request flag 128 has been set ("yes" output to decision block 300), fingerprint reader resetting system 10 determines whether a physical presence for the user has been established (decision block 330). If a physical presence for a user has not been established ("no" output to decision block 330), the method proceeds to block 310 thereafter. Returning to decision block 330, if, however, a physical presence for a user has been established ("yes" output to decision block 330), fingerprint reader resetting system 10 transmits a command to set physical presence state to unlock (block 335). Fingerprint reader resetting system 10 then issues a command to reset fingerprint reader 90 to a factory state, with the method proceeding to block 320 thereafter.

The illustrative embodiments may be implemented in software and can be adapted to run on different platforms and operating systems. In particular, functions implemented by fingerprint reader resetting system 10, for example, may be provided by an ordered listing of executable instructions that can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate or transport the program for use by or in connection with the instruction execution system, apparatus, or device. The computer-readable medium can be, for example, but is not limited to, an electronic, magnetic, optical, electro-magnetic, infrared, or semi-conductor system, apparatus, device, or propagation medium.

Embodiments of fingerprint reader resetting system 10 provide a system and method for securely resetting fingerprint reader 90 without using the fingerprint and/or other secure user authentication. Embodiments of fingerprint reader resetting system 10 substantially prevent an unintended user (e.g., a hacker) from using other software devices (e.g., malware, etc.) to access electronic device 100 and/or data stored on electronic device 100. Furthermore, embodiments of fingerprint reader resetting system 10 enable a remote user and/or administrator to reset fingerprint reader resetting system 10, thereby facilitating scalability and easy resetting of a plurality of fingerprint readers 90.

What is claimed is:

1. A fingerprint reader resetting method, comprising:
   enabling an electronic device to accept a reset command for a fingerprint reader in response to a physical presence state being set to unlocked during initialization of the electronic device to reset a state of the fingerprint reader; and
   identifying a remote reset request configured for a remote user to reset the fingerprint reader.

2. The method of claim 1, further comprising locking the fingerprint reader to prevent acceptance of the reset command in response to the physical presence state being set to locked.

3. The method of claim 1, further comprising enabling the electronic device to write once into the physical presence state in response to the physical presence state being set.

4. The method of claim 1, further comprising setting the physical presence state to unlocked in response to identifying a user input as valid confirmation of a physical presence.

5. The method of claim 1, further comprising setting the fingerprint reader to a factory state in response to the reset command being executed.

6. The method of claim 1, further comprising clearing user identification information in response to the reset command being executed.

7. A fingerprint reader resetting method, comprising:
   enabling an electronic device to accept a reset command for a fingerprint reader in response to a physical presence state being set to unlocked during initialization of the electronic device to reset a state of the fingerprint reader; and
   enabling a remote user to bypass a confirmation of a physical presence at the electronic device.

8. A fingerprint reader resetting system, comprising:
   an electronic device having a fingerprint reader resetting module configured to execute a reset command in response to a physical presence state being set to unlocked during initialization of the electronic device to reset a state of a fingerprint reader at the electronic device, wherein the fingerprint reader resetting module is configured to identify a remote reset request to enable a remote user to reset the fingerprint reader.

9. The system of claim 8, wherein the fingerprint reader resetting module is configured to prevent execution of the reset command in response to the physical present state being set to locked.

10. The system of claim 8, wherein the fingerprint resetting module is configured to write once into the physical presence state in response to the physical presence state being set.

11. The system of claim 8, wherein the fingerprint reader resetting module is configured to set the physical presence state to unlocked in response to identifying a user input as a valid confirmation of a physical presence.

12. The system of claim 8, wherein the fingerprint reader resetting module is configured to set the fingerprint reader to a factory state in response to the reset command being executed.

13. The system of claim 8, wherein the fingerprint reader resetting module is configured to clear user identification information in response to the reset command being executed.

14. A computer-readable medium having stored thereon on instructions set to be executed, the instruction set, when executed by a processor, causes the processor to:
   enable an electronic device to accept a reset command for a fingerprint reader in response to a physical presence state being set to unlocked during initialization of the electronic device to reset a state of the fingerprint reader, wherein the instruction set, when executed by the processor, causes the processor to identify a remote reset request to enable a remote user to reset the fingerprint reader.

15. The computer-readable medium of claim 14, wherein the instruction set, when executed by the processor, causes the processor to lock the fingerprint reader to prevent acceptance of the reset command in response to the physical presence state being set to locked.

16. The computer-readable medium of claim 14, wherein the instruction set, when executed by the processor, causes the processor to set the physical presence state to unlocked in response to identifying a user input as a valid confirmation of a physical presence.

17. The computer-readable medium of claim 14, wherein the instruction set, when executed by the processor, causes the processor to set the fingerprint reader to a factory state in response to the reset command being executed.

* * * * *